Patented Sept. 7, 1948

2,448,565

UNITED STATES PATENT OFFICE 2,448,565

DIMETHYL SILICONE ELASTOMERS AND METHOD OF PREPARING THE SAME

James G. E. Wright, Alplaus, and Curtis S. Oliver, Schenectady, N. Y., assignors to General Electric Company, a corporation of New York No Drawing. Application March 14, 1944, Serial No. 526,472

13 Claims. (Cl. 260—37)

1

The present invention relates to dimethyl silicone elastomers and to an improved process of preparing such products from dimethyl silicones.

The copending application of Maynard C. Agens, Serial No. 526,473 filed concurrently herewith and assigned to the same assignee as the present invention, discloses and broadly claims dimethyl silicone elastomers. In accordance with the invention covered by the Agens application a dimethyl silicone is converted to an elastic, solid or gum by suitable treatment, for example, by treatment with ferric chloride, and the product is worked on rubber rolls with suitable fillers, etc., until it can be molded or extruded. To obtain products possessing the maximum strength, the molded or extruded materials are given a further heat treatment after removal from the molding or extruding apparatus.

The present invention is an improvement on the invention described in the above-mentioned Agens application. One object of the present invention is to provide an improved silicone elastomer. Another object of the invention is to provide an improved process whereby stronger and harder elastomeric products may be obtained. A further object of the invention is to provide a silicone solid, elastic product which can be more rapidly cured, for example in a closed mold, to the point at which a usable product of suitable strength is obtained.

The above and other objects which will become apparent from the following detailed description are attained by adding a small quantity of benzoyl peroxide to the silicone gum, i. e., to a solid, elastic, curable, methylpolysiloxane containing an average from 1.98 to 2.0 methyl groups per silicon atoms, thereby imparting to the material the property of curing in a heated mold and of curing more rapidly to an improved product when the formed composition is heated in an oven.

Although the reactions involved in the curing of silicone materials by means of benzoyl peroxide are not known, the effect thereof is real and marked. The amount of benzoyl peroxide added to the gum depends to some extent on the desired characteristics of the cured product. Generally the benzoyl peroxide is used in amounts ranging from 1 to 5 or 6 per cent by weight based on the weight of the dimethyl silicone gum. One per cent of the peroxide markedly increases the rate of cure and tensile strength of the elastomer. Optimum values for tensile strength, hardness, elongation and curing time are obtained with about 2.5 per cent benzoyl peroxide. Within limits, the tensile strength and hardness of the cured products increases and the elongation and time of cure decreases with increase in the benzoyl peroxide content. Although larger quantities may be added, the amount of benzoyl peroxide employed as the curing agent ordinarily should not exceed about 6 per cent, particularly where the product will be continuously subjected to elevated temperatures.

Any of the dimethyl silicone gums described in the Agens application may be used in carrying out the present invention. The gums prepared from liquid dimethyl silicones having a methyl-to-silicon ratio of 1.98 to 2.00, preferably from 1.995 to 2.000, are preferred. As is more fully described in the copending Agens application, these liquid silicones or polysiloxanes may be prepared for example by the hydrolysis of a dimethyldihalogenosilane containing from 0 to 2 mol per cent monomethyltrihalogenosilane and may therefore be described as methylpolysiloxanes consisting of methyl groups and silicon and oxygen atoms and having a methyl to silicon ratio of from 1.98 to 2.0 It is, therefore, apparent that the starting liquid dimethyl silicones may be considered as consisting of polymeric dimethylsiloxane containing up to 2 mol per cent copolymerized monomethylsiloxane.

The silicone gum, fillers, etc., are compounded in the usual manner with the addition of the required amount of benzoyl peroxide. The benzoyl peroxide may be added at any time during the processing of the elastomer provided a thorough distribution of the peroxide throughout the gum is obtained prior to molding or extruding. For example, the gum, benzoyl peroxide, fillers, etc., may be mixed together in an ordinary dough mixer at room or slightly elevated temperatures. After the ingredients are thoroughly mixed, the contents of the dough mixer are transferred to rubber rolls for further working at room or elevated temperatures. If desired, the preliminary mixing step in the dough mixer may be omitted and all of the mixing done on the milling rolls. As elevated mixing temperatures accelerate the cure, the temperature of the rolls should be regulated so as to ensure a thorough mixing of the ingredients before the cure has progressed to a point where the mass cannot be satisfactorily molded or extruded.

One specific method of carrying out our invention is given in the following example which also illustrates the effect of various quantities of benzoyl peroxide on the properties of the elastomer.

*Example.*—Five hundred parts of a liquid dimethyl silicone containing 1.998 methyl groups per silicon was mixed with 2.5 parts of ferric chloride hexahydrate in 55 parts of toluene. This mixture was heated to reflux temperature for one hour and then poured out into an open container where it solidified on cooling. Three portions of this elastic gum were compounded with a filler and benzoyl peroxide in the proportions listed in the following table:

| Composition | A | B | C |
| --- | --- | --- | --- |
|  | Parts by weight | Parts by weight | Parts by weight |
| Silicone gum | 84 | 86 | 86 |
| Lithopone | 168 | 172 | 172 |
| Benzoyl peroxide | 0 | 2 | 5 |
| Toluene | 25 | 25 | 25 |

In each case the gum was worked on the mixing rolls for five minutes at room temperature. The toluene, or toluene solution of benzoyl peroxide, was then added and mixing was continued for five minutes. The lithopone was then added and milling was continued for ten minutes. No appreciable differences were noted between the three batches during mixing.

Each of these three batches was molded for ten minutes in a press heated to 150 deg. C. As removed from the press, the sheet containing no benzoyl peroxide (A) was soft, that containing 2 parts benzoyl peroxide (B) was firm and hard, and that containing 5 parts benzoyl peroxide (C) was still harder and firmer.

The tensile strength, Shore hardness, and elongation of the sheets as they came from the mold, and after additional heat treatment, are listed in the following table:

| Sample number | Per cent Benzoyl Peroxide | Time of Heating | Tensile strength | Shore hardness | Elongation |
| --- | --- | --- | --- | --- | --- |
|  |  | Hours | Lbs./in.² |  | Per cent |
| A1 | 0 | none | 8 | 10 | 200 |
| A2 | 0 | 1 | 27 | 15 | 200 |
| A3 | 0 | 3 | 26 | 16 | 250 |
| A4 | 0 | 12 | 61 | 25 | 300 |
| B1 | 2.4 | none | 147 | 32 | 300 |
| B2 | 2.4 | 1 | 193 | 35 | 300 |
| B3 | 2.4 | 3 | 160 | 40 | 200 |
| B4 | 2.4 | 12 | 272 | 45 | 200 |
| C1 | 5.8 | none | 167 | 42 | 300 |
| C2 | 5.8 | 1 | 264 | 52 | 100 |
| C3 | 5.8 | 3 | 255 | 60 | 200 |
| C4 | 5.8 | 12 | 375 | 65 | 100 |

These results clearly show the beneficial effects of benzoyl peroxide in increasing the hardness and tensile strength of silicone rubber when cured in the mold, and also when additional vulcanization is secured by prolonged heating.

It is to be understood that the invention is not restricted to the fillers mentioned hereinbefore. Inorganic fillers other than lithopone which may be employed are ferric oxide, titanium dioxide, talc, zinc oxide, etc.

The silicone elastomers prepared and vulcanized according to our invention are capable of withstanding high temperatures (150–200 deg. C.) for long periods of time and retain their desidable rubbery properties at temperatures as low as −50 deg. to −60 deg. C. They may be used as conductor insulation, gasket materials, shock absorbers, and for other applications for which known natural and synthetic rubbers have been used.

What we claim as new and desire to secure by Letters Patent of the United States is:

1. A composition comprising a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, having incorporated therein from 1 to 6 per cent by weight thereof of benzoyl peroxide.

2. A heat-curable composition comprising (1) a filler, (2) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, and (3) benzoyl peroxide in an amount from 1 to 6 per cent by weight of the solid methylpolysiloxane of (2).

3. A product comprising the cured composition of claim 2.

4. A silicone composition capable of being cured in a closed mold, said composition comprising (1) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) an inorganic filler and (3) benzoyl peroxide in an amount corresponding to 2.5 per cent by weight of the solid methylpolysiloxane of (1).

5. A molded article comprising the product of molding under heat a composition containing a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, having incorporated therein 2.5 per cent by weight thereof of benzoyl peroxide.

6. A moldable composition comprising a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, having incorporated therein from 1 to 5 per cent by weight thereof of benzoyl peroxide.

7. A product comprising the molded composition of claim 6.

8. A cured elastomer comprising the product obtained by heating a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, having incorporated therein from 1 to 6 per cent by weight thereof of benzoyl peroxide.

9. A composition comprising a heat-treated mixture of ingredients including (1) a filler comprising an oxide of iron, (2) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, and (3) benzoyl peroxide in an amount corresponding to from 1 to 6 per cent by weight of the solid methylpolysiloxane of (2).

10. The method which comprises incorporating benzoyl peroxide into a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, in an amount from 1 to 6 per cent by weight of the said solid methylpolysiloxane, and heating the resulting product thereby to accelerate the curing of the said solid methylpolysiloxane.

11. An elastomeric product comprising a heat-treated mixture of ingredients including (1) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, (2) benzoyl peroxide in an amount corresponding to from 1 to 6 per cent by weight of the solid methylpolysiloxane of (1), and (3) a filler comprising lithopone.

12. The method which comprises treating a dimethyl silicone with ferric chloride hexahydrate to convert the said silicone to a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, incorporating benzoyl peroxide into the said solid methylpolysiloxane in an amount corresponding to from 1 to 6 per cent by weight thereof, and heating the resulting composition thereby to obtain a cured elastomer of improved properties.

13. The method which comprises treating a liquid dimethyl silicone with ferric chloride hexahydrate to convert the said silicone to a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid consisting of polymeric dimethylsiloxane containing up to 2 mol per cent copolymerized monomethylsiloxane, mixing said solid methylpolysiloxane with ingredients including a filler and benzoyl peroxide in an amount corresponding to from 1 to 6 per cent by weight of the solid methylpolysiloxane, and heating the resulting composition.

JAMES G. E. WRIGHT.
CURTIS S. OLIVER.

REFERENCES CITED

The following references are of record in the file of this patent:

FOREIGN PATENTS

| Number | Country | Date |
|---|---|---|
| 113,708 | Australia | Sept. 4, 1941 |